United States Patent [19]

Colarusso et al.

[11] Patent Number: 5,002,378
[45] Date of Patent: Mar. 26, 1991

[54] LIGHT WEIGHT COOLED MIRROR

[75] Inventors: Joseph M. Colarusso, Nashua, N.H.; Charles D. Houghton, Manchester, Mass.

[73] Assignee: Litton Systems, Inc., Lexington, Mass.

[21] Appl. No.: 563,025

[22] Filed: Aug. 3, 1990

[51] Int. Cl.5 ................................................ G02B 5/08
[52] U.S. Cl. ..................................... 350/610; 350/641
[58] Field of Search ............... 350/607, 608, 609, 610, 350/641

[56] References Cited

U.S. PATENT DOCUMENTS

| | | | |
|---|---|---|---|
| 4,386,825 | 6/1983 | Stalcup et al. | 350/610 |
| 4,433,045 | 2/1984 | Gowan et al. | 350/607 |
| 4,435,045 | 3/1984 | Fried | 350/607 |
| 4,770,521 | 9/1988 | Thompson et al. | 350/610 |
| 4,772,110 | 9/1988 | Roszhart | 350/610 |

Primary Examiner—Bruce Y. Arnold
Assistant Examiner—J. P. Ryan
Attorney, Agent, or Firm—Michael H. Wallach; Robert F. Rotella

[57] ABSTRACT

A lightweight cooled mirror is disclosed in which cooling of the mirror's reflecting surface is provided by a two-phase fluid contained in an enclosed chamber behind the reflecting surface. The chamber includes an evaporator section in contact with the reflecting surface and a condenser section spaced apart from the reflecting section. The fluid is capable of existing in both liquid and gaseous states. When in a liquid state, the fluid can absorb heat from the reflecting surface which transforms the liquid into a gas. The gas is transported away from the reflecting surface to a section in the enclosed chamber where it gives up the absorbed heat by condensation and is converted back into a liquid which is reused to absorb additional heat from the reflecting surface. The liquid is transported back toward the reflecting surface by a wicking action to complete the closed loop fluid flow system.

6 Claims, 1 Drawing Sheet

LIGHT WEIGHT COOLED MIRROR

BACKGROUND OF THE INVENTION

1. Field of the Invention

This invention relates to optical mirrors in general and, in particular, to a mirror having the capability of removing heat from the mirror's relecting facesheet.

2. Summary of the Prior Art

Mirrors utilized in optical systems which require a thermally stabilized reflecting surface are known in the art. Frequently mirrors used in applications in which heat may affect the quality of the image reflected from the reflecting surface or which are subject to high heat loads, for example mirrors used as reflectors in laser systems, will utilize a cooled facesheet to remove heat generated at the reflecting surface. The cooling in such mirrors is often accomplished by passing a cooling fluid through channels in the facesheet or spraying a cooling fluid against the back of the facesheet. In either type of mirror construction, the heat is removed by having the fluid absorb the heat from the facesheet. The fluid is then circulated by means of a pump or other means to a heat exchanger or other form of radiator in which the heat can be removed from the cooling fluid and the fluid recirculated to remove additional heat from the mirror's reflecting surface. The circulation of coolant through a mirror structure can result in the introduction of undesirable vibrations or flow noise which will affect the quality of the optical image reflected from the mirror's surface. Frequently, there is a need for a mirror in which the reflecting surface includes some cooling, but which does not require the extent of heat removal to justify the use of a circulating fluid.

U.S. Pat. No. 4,770,521, which issued on Sept. 13, 1988, discloses a cooled mirror substrate isolator in which a portion of the support structure is constructed of a porus isotropic material having transpiration flow paths to provide cooling of the isolator. The foregoing construction prevents heat extracted by the primary heat exchanger in the mirror from flowing into the mirror's substrate, thereby increasing the stability of the mirror's reflecting surface. U.S. Pat. No. 4,657,359, which issued on Apr. 14, 1987, discloses a transporationally-cooled laser mirror in which a substrate used to support the mirror's reflecting surface is manufactured from a porus material to permit a fraction of the coolant circulated through the mirror's facesheet to bleed through the substrate to provide cooling and thermal isolation of the mirror's substrate. Each of the mirrors described in the foregoing patents require active circulation of coolant to effect cooling of the mirror's reflecting surface.

SUMMARY OF THE INVENTION

A principal object of this invention is to provide a self-contained mirror which includes a reflecting surface and an integral means for removing heat from the mirror's reflecting surface without requiring either pumps or an additional suppoly of fluid to effect the cooling process.

An additional object of the invention is to provide a cooled mirror in which cooling is effected by the use of a two-phase fluid (i.e. a fluid which can exist in the vapor and liquid phases) contained entirely within the mirror's structure.

Still another object of the invention is to provide a cooled mirror in which cooling of the reflecting surfaces is provided without introducing undesirable vibrations (i.e. fluid flow noise) into optical signals impinging on the reflecting surface.

The above and other objects and advantages of the invention are achieved by providing a low density foam core to separate the facesheet and backsheet of a mirror. The facesheet has a reflecting optical surface on one side thereof. The foam core of the mirror includes a first area adjoining the facesheet in which the foam is densified and a second area in contact with the backsheet in which the foam is also densified. A fluid-impervious closure ring attached to the circumference of the facesheet and backsheet seals the foam core from the outside environment and permits the core to retain a fluid which can absorb heat and which can exist in both a liquid and a gaseous phase of the same ambient pressure, for example 10 psia. The densified foam at the facesheet end of the mirror acts as an evaporator section for the two-phase fluid and the densified foam at the backsheet end of the mirror acts as a condensing section. The low density foam in the central core of the mirror provides a media in which two phase flow may exist. Vaporized gas will be permitted by the foam to be transported from the evaporated section to the condenser section via voids within the low density foam core, and liquified fluid may flow from the condenser section back to the evaporated section via the wicking action provided by the fibrous structure of the foam core. In a second disclosed embodiment, capillary tubes may be provided to interconnect the evaporator and condenser sections, thereby increasing the flow of liquified fluid within the low density central core of the mirror. The high heat transfer rate from the facesheet to the backsheet provided by the disclosed thermodynamic system results in a small axial temperature gradient from the facesheet to the backsheet. Since the greatest source of wavefront error for a mirror used to reflect high energy optical signals is thermally-induced distortion, the disclosed invention finds particular applicability in systems in which it is desired to minimize such thermal distortion produced by the heating of reflecting surfaces.

BRIEF DESCRIPTION OF THE DRAWINGS

The foregoing and other objects, advantages and features of the invention will be more readily apparent upon review of a detailed description of two preferred embodiments when read in conjunction with the accompanying drawing in which.

DETAILED DESCRIPTION OF PREFERRED EMBODIMENTS

Figure 1:
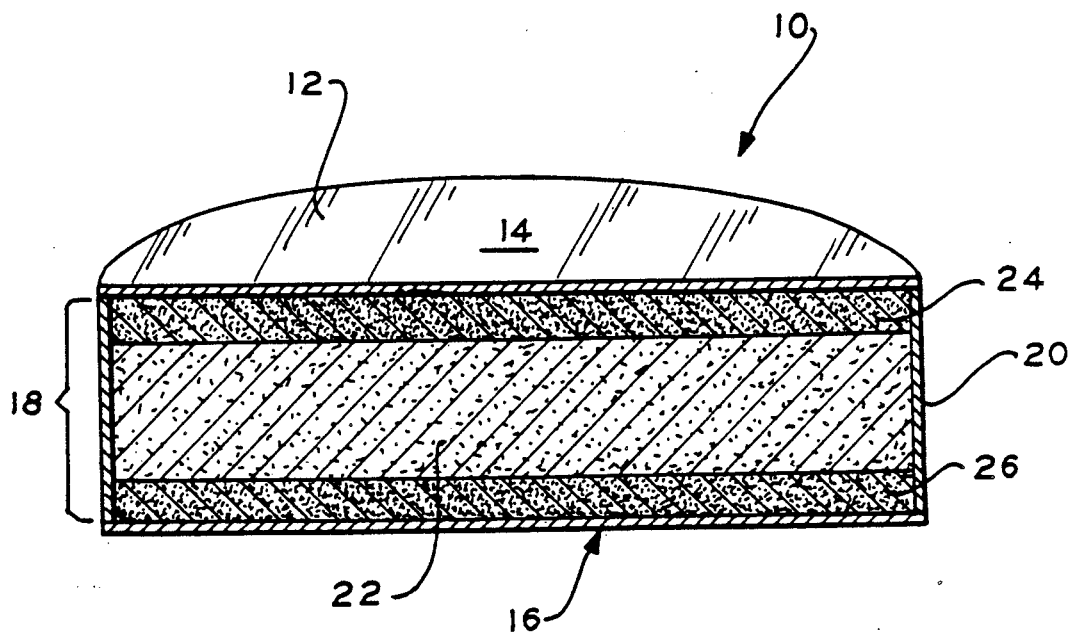
FIG. 1 is a perspective view, partially in section, of a mirror constructed in accordance with the teachings of the present invention.

Referring to the drawing, FIG. 1 shows a mirror 10 constructed in accordance with the teachings of the disclosed invention. The mirror 10 includes a facesheet 12 having a polished reflecting surface 14 on one side thereof. Preferably the facesheet is made from a material which may be polished and which may have applied thereto (for example by vapor deposition) a reflecting surface. Suitable materials include glass, such as ultra-low expansion glass, silicon carbide, aluminum, a high-temperature ceramic, beryllium or other optical material. The mirror 10 also includes a backsheet 16, preferably manufactured from a material which is the same as or has a similar coefficient of thermal expansion as the material used for the facesheet 12. The facesheet 12 and backsheet 16 sandwich a multi-density cellular foam core structure shown generally at 18. The foam core 18 is incased within the mirror 10 by a closure ring 20 which is sealed to the facesheet 12 and backsheet 16 to form a fluid-tight chamber within the mirror. Preferably the core 18 includes a low density transport section 22 and higher density evaporator section 24 which adjoins the facesheet 12. A second high density condenser section 26 adjoins the backsheet 16. The facesheet 14 and backsheet 16 can be bonded to, fritted to, fused to or otherwise mechanically attached to the core material 24, 26. The facesheet and backsheet 14, 16 can also be integral with the core 24, 26. An example of this would be the densification of the core 24, 26 into a solid to form the surfaces of the reflecting surface 14, and back surface 16 of the mirror.

the internal core 18 is charged with a fluid which can exist in two phase states, for example water, ammonia or alcohol. The fluid is capable of existing in a liquid or a gaseous state. When in a liquid state, it is capable of absorbing significant amounts of heat which cause it to transform from a liquid into a gaseous state. The ring 20 seals the inner core of the mirror from the external environment to insure that the fluid is completely contained within the mirror whether in a liquid or a gaseous state. The foam core 18 is manufactured from a material which will permit the movement of vaporized gas from the evaporator section 24 of the mirror through the core 22 to the condenser section 26 via the movement of the gas through voids within the foam structure, and the movement of the liquified fluid from the section 26 to the section 24 via wicking action along the fibers which comprise the porous core structure. Preferably the material which comprises the core 18 will be manufactured from the same material as the facesheet 12, the backsheet 16 and ring 20 to minimize influences in structure caused by differences in the coefficient of thermal expansion of the utilized material.

Heat absorbed in the mirror facesheet 12 will cause the fluid in the core 18 to change states and becomes a gas within the densified region 24 of the core. The change from a liquid to a gas will absorb heat in the facesheet structure. The gas will flow from the facesheet side of the mirror toward the backsheet where it will recondense into a liquid at the densified portion 26, with the loss of heat which will be radiated from the backsheet 16 into the environment. The liquid will collect in the densified section 26 and be wicked back toward the evaporator section 24 by wicking action along the structure of the core 18. In cases where very high input heat fluxes occur in the facesheet's optical surface, and the desired temperature level of the mirror system is low (for example; less than 100°C.) an additional enhanced heat transfer system can be applied at the rear surface of the backsheet. For example extended surfaces (fins), forced convection fluid flow schemes, or spray cooling of fluid onto the backsheet can be used to further remove thermal energy from the mirror system.

Figure 2:
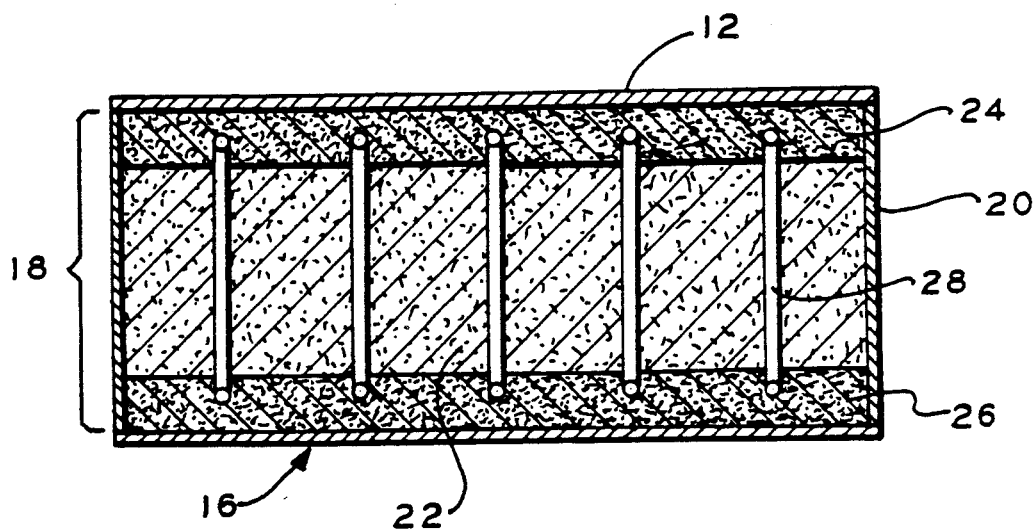
FIG. 2 is a sectional view of a second embodiment of the invention.

FIG. 2 shows an embodiment of the invention which will permit the removal of greater heat loads on the facesheet 12, for example when the reflecting surface 14 is used to redirect a high energy laser beam. Under the foregoing circumstances, it is desirable to have an additional fluid transfer mechanism to enhance the return of the condensed fluid from the condenser section 26 to the evaporator section 24 of the core 18. FIG. 2 shows that a number of capillary tubes 28 are used to interconnect the evaporator section 24 and condenser section 26 to provide enhanced transport of the fluid in liquid form from the condenser section 26 to the evaporator section 24. Use of the capillary tubes 28 increases the fluid flow within the central section 22 of core 18.

While the best mode of two embodiments have been shown and described herein, it should be understood that various other changes, modifications and variations may become apparent to those skilled in the art after reviewing the detailed description of the enclosed invention. It is the intended that also changes and additions be covered within the spirit and scope of the invention and that the invention be limited only by the permissible scope of interpretation of the following claims.

we claim:

1. A cooled mirror comprising:
   a. a facesheet having a front reflecting surface and a rear surface;
   b. a backsheet spaced apart from said facesheet;
   c. a foam core in the space between said facesheet and said backsheet, said foam core being comprised of a porous material interspersed with hollow voids, said foam core having a first densified area adjoining the area between said foam core and said facesheet and a second densified area adjoining the area between said foam core and said backsheet,
   d. a two-phase fluid capable of existing in liquid and gaseous states in said foam core; and
   e. a retaining ring for enclosing the space between said facesheet and said facesheet.

2. The cooled mirror of claim 1 wherein said foam core, said facesheet and said backsheet are manufactured from the same material.

3. The cooled mirror of claim 2 wherein said retaining ring is manufactured from the same material as said facesheet and said backsheet.

4. The cooled mirror of claim 1 further including two or more capillary tubes connecting the first densified area of said foam core to the second densified area of said foam core.

5. A cooled mirror comprising:
   a. a facesheet having a front reflecting surface and a rear surface;
   b. a backsheet spaced apart from said facesheet;
   c. a ring for joining said facesheet and said backsheet, said ring forming an enclosed chamber between said facesheet and said backsheet; and
   d. Porous means occupying the enclosed chamber between said facesheet and said backsheet to permit the movement by wicking action of a fluid capable of existing in a liquid or a gaseous state between said facesheet and said backsheet.

6. The cooled mirror of claim 5 wherein the density of said porous means occupying the enclosed chamber is greater in the vicinity of said facesheet and said backsheet.

* * * * *